United States Patent [19]

Ogawa et al.

[11] 4,420,540

[45] Dec. 13, 1983

[54] MAGNETIC RECORDING MEDIUM

[75] Inventors: Hiroshi Ogawa; Yasuo Tamai, both of Odawara, Japan

[73] Assignee: Fuji Photo Film Co., Ltd., Kanagawa, Japan

[21] Appl. No.: 431,534

[22] Filed: Sep. 30, 1982

[30] Foreign Application Priority Data

Nov. 6, 1981 [JP] Japan .................................. 56-177987

[51] Int. Cl.$^3$ ............................................... H01F 10/02
[52] U.S. Cl. .................................... 428/457; 428/695; 428/900
[58] Field of Search ......................... 428/457, 695, 900

Primary Examiner—Bernard D. Pianalto
Attorney, Agent, or Firm—Sughrue, Mion, Zinn, Macpeak and Seas

[57] ABSTRACT

A magnetic recording medium is disclosed. The medium is comprised of non-magnetic flexible support base having coated thereon a magnetic layer comprised of a ferromagnetic powder dispersed in a binder and a branched saturated fatty acid. The fatty acid has a melting point of 20° C. or less and contains from 12 to 30 carbon atoms. By including the particular fatty acid, it is possible to obtain a magnetic recording medium having excellent electromagnetic properties, excellent running properties and durability.

7 Claims, No Drawings

MAGNETIC RECORDING MEDIUM

FIELD OF THE INVENTION

This invention relates to a magnetic recording medium, and more particularly to a magnetic recording medium having excellent electromagnetic characteristics, running properties and durability.

BACKGROUND OF THE INVENTION

A magnetic recording media must have high output, particularly if they are audiocassette tapes used for recording music. More specifically, such tapes must have better frequency characteristics and better ability to reproduce recorded sound. Car stereos and radios with audiocassette recorders are getting very common and such devices promote the frequent use of such tapes. Accordingly, a tape having good running properties and durability is required.

In a videocassette tape recording system, recorded wave lengths are made shorter and the track width is made narrower to achieve a high density recording. Therefore, it is necessary for the tape to have a high output level and reproducing ability of an original image having a high S/N ratio. It is also necessary for a recording tape for a commercial video tape recorder (VTR) to have a thickness of about 20 μm or thinner. The running property and durability of the tapes must be better than conventional video tapes due to the increased use of such tapes. Therefore, it is necessary to develope audio tapes and video tapes with better electromagnetic and running properties as well as increased durability.

Various additives have been proposed to improve these properties. However, none of the additives can completely satisfy all of the above requirements.

An example of one additive is a linear fatty acid which is obtained from animal or vegetable fats and oils, as described in U.S. Pat. Nos. 3,833,412 and 3,470,021. It is often used because it is cheap and provides good lubricating effects. However, these linear fatty acids such as linear saturated fatty acids (e.g., lauric acid, myristic acid or stearic acid) which are added to a magnetic recording layer are often separated from the layer and come out as a white powder on the surface of the magnetic recording layer. This separation occurs because they have a high boiling point and are easily crystallized. The white powder changes the output level and causes dropout. Further, linear unsaturated fatty acids (e.g., oleic acid or linolic acid) decrease the running property and durability of magnetic recording tapes with the passage of time. This happens because of oxidation with the passage of time. Furthermore, the use of such fatty acids does not provide sufficient running property at high temperature and high humidity.

SUMMARY OF THE INVENTION

As the result of our research and development relating to various additives for magnetic recording layer, we have found that excellent running property and durability can be obtained when branched saturated fatty acids are used.

A primary object of the invention is to provide a novel magnetic recording medium.

Another object of the invention is to provide a magnetic recording medium having excellent electromagnetic properties.

Yet another object of the invention is to provide a magnetic recording medium having excellent running property and durability.

The above objects of the invention can be attained by a magnetic recording medium comprising a non-magnetic flexible support having coated thereon a magnetic layer containing a ferromagnetic powder dispersed in a binder and a branched saturated fatty acid having a melting point of not higher than 20° C. and having not less than 12 carbon atoms.

DETAILED DESCRIPTION OF THE INVENTION

Branched saturated fatty acids employed in the present invention are fatty acids having a branched alkyl group, preferably 3 or more branched alkyl groups. The branched alkyl group has less carbon atoms than the main chain of fatty acid. The fatty acid can be prepared by conventional well known methods such as an oxo method, preferably from ethylene, proylene, α-olefine or carbon monoxide.

Natural fatty acids include branched saturated fatty acids such as isomyristic acid (12-methyltridecanoic acid) or isostearic acid (16-methylheptadecanoic acid). However, they are not preferred because they have a high boiling point and make white powder on the surface of magnetic recording layer.

Typical examples of the branched saturated fatty acids used in connection with the present invention are shown below.

Compound 1 (branched lauric acid having a melting point of not higher than 10° C.)

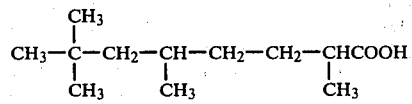

Compound 2 (branched myristic acid having a melting point of not higher than 0° C.)

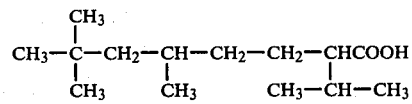

Compound 3 (branched stearic acid having a melting point of not higher than 0° C.)

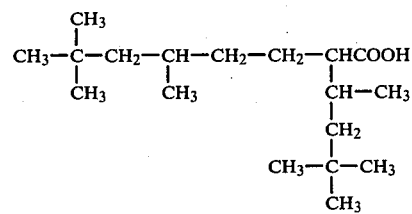

These fatty acids are commercially available. In addition to the above examples, other saturated fatty acids having various branched chains can also be used in the invention.

The branched saturated fatty acids employed in the present invention have a melting point of not higher than 20° C., preferably a melting point of not higher than 10° C. The fatty acids having a melting point of higher than 20° C. are not preferred in the present invention because they are easily crystallized forming white powder on the surface of the magnetic recording layer.

The branched saturated fatty acids used in the invention preferably have from 12 to 30 carbon atoms, more preferably from 12 to 22 carbon atoms, including the carbon atom of carboxyl group. The fatty acids having less than 12 carbon atoms are not preferred because they have a strong unpleasant odor. Those having more than 30 carbon atoms are not preferred because they provide less lubricating effect and have higher melting points.

The branched saturated fatty acids are used in an amount of about 0.1 to about 10 wt%, preferably 0.5 to 5 wt% based on the amount of ferromagnetic powder. If the amount of the fatty acids is less than 0.1 wt%, lubricating effects can not be obtained, and if the amount of the fatty acids is more than about 10 wt%, the lubricating effects are decreased.

The branched saturated fatty acids may be used alone or in combination with each other or in combination with conventional additives.

A magnetic recording medium of the present invention is prepared by coating on a support a magnetic coating composition containing a ferromagnetic powder, a binder, a branched saturated fatty acid as described above and an organic solvent. If necessary, other additives may be included.

Preferred ferromagnetic powder used includes $\gamma$-$Fe_2O_3$, Co-modified iron oxide and an alloy powder containing iron as a main component.

A ferromagnetic powder, an additive agent, an organic solvent, a dispersing method, a coating method, etc. which are employed in the invention are disclosed in U.S. Pat. Nos. 3,026,215, 3,031,341, 3,100,194, 3,242,005, 3,389,014 and 4,135,016 herein incorporated by reference and British Pat. Nos. 752,659, 782,762 and 1,007,323.

The magnetic recording medium of the invention will be explained in more detail by the following examples. However, the scope of the invention should not be limited to the examples. In the examples, "part" means "part by weight."

EXAMPLE 1

| | |
|---|---|
| $\gamma$-$Fe_2O_3$ (Hc: 380 Oe; acicular ratio: 10:1; average particle length: 0.4$\mu$) | 100 parts |
| Vinyl chloride/vinyl acetate/vinyl alcohol copolymer (weight ratio: 90/5/5; polymerization degree: about 400) | 20 parts |
| Polyester polyurethane (molecular weight: about 130,000) | 5 parts |
| Branched saturated fatty acid shown in Table 1 | 3 parts |
| Methyl ethyl ketone | 200 parts |
| Cyclohexanone | 100 parts |

The above composition was kneaded and dispersed for 3 hours by means of a batch type sand grinder, and then filtrated by a filter having an average pore diameter of 3 microns to provide a magnetic coating composition.

The coating composition obtained was coated on a polyethylene terephthalate film having a thickness of 7 microns in a dry thickness of 5 microns by means of a reverse roll. The coated film was subjected to magnetic orientation by an electric magnet of 1000 gauss before the magnetic recording layer was dried. Drying was then carried out. The dried magnetic recording layer was subjected to a super-calender roll treatment to make the surface of the magnetic recording layer more smooth. The magnetic tape obtained was slit to a width of 3.81 mm and put into a Phillips-type compact cassette to provide an audiocassette tape. The characteristics of the tapes are shown in Table 1.

Comparative Example 1

The same procedure as in Example 1 was repeated using a linear saturated fatty acid and a linear unsaturated fatty acid instead of the branched saturated fatty acid to obtain an audio tape. The results obtained are shown in Table 1.

TABLE 1

| | Sample No. | Fatty Acid | Sensitivity | Frequency Characteristics | MOL | SOL | Audio Running Properties | Head Staining | Tape Squeal | White Powder Production |
|---|---|---|---|---|---|---|---|---|---|---|
| Example 1 | 1 | Compound 1 | 0.2 | 0.8 | 0.5 | 1.5 | A | A | A | none |
| | 2 | Compound 2 | 0.1 | 0.7 | 0.3 | 1.2 | A | A | A | none |
| | 3 | Compound 3 | 0.0 | 0.8 | 0.3 | 1.1 | A | A | A | none |
| Comparative Example 1 | C-1 | Oleic Acid | 0.0 | 0.0 | 0.0 | 0.0 | A | B | C | present (about 1 to 2 mg/m$^2$) |
| | C-2 | Stearic Acid | −0.3 | −0.5 | −0.6 | −0.9 | A | B | B | present (about 1 to 2 mg/m$^2$) |

(Note)
Compound 1:
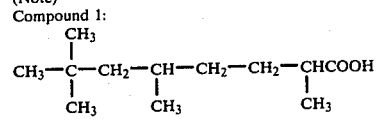

Compound 2:
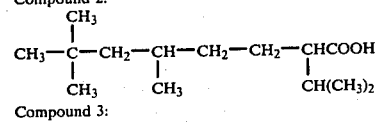

Compound 3:
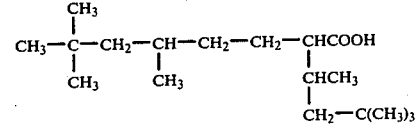

The various tape characteristics indicated in Table 1 were measured by the following methods:

(a) Sensitivity

The output at 315 Hz where sample tapes were recorded at an input of 120 μm-20 dB under normal bias and reproduced was measured, with a cassette tape deck Model 582 of Nakamichi Co., Ltd. (the same cassette tape deck was used in (b), (c) and (d) below). The output is shown by a relative value with the output of tape No. C-1 being set at 0.0 dB.

(b) Frequency Characteristics

The output at 10 KHz minus the output at 315 Hz was measured where the input was −20 dB.

The output is shown by a relative value with the output of tape No. C-1 being set at 0.0 dB.

(c) MOL (maximum output level)

The output at 315 Hz was measured where the third harmonic wave was 3%.

The output is shown by a relative value with the output of tape No. C-1 being set at 0.0 dB.

(d) SOL (saturated output level)

The saturated output at 10 KHz was measured.

The output is shown by a relative value with the output of tape No. C-1 being set at 0.0 dB.

(e) Audio Running Properties

Tape running tests were conducted with 20 commercial cassette tape decks to see how orderly the tape samples could be wound during 20 passes, and the results were evaluated on a three-grade basis.

A ... could be wound orderly except on 1 deck.
B ... could not be wound orderly on 2 to 5 decks.
C ... could not be wound orderly on 6 or more decks.

(f) Head Staining

After evaluation of the tape running property, the head of each deck was checked for the presence of stain and the results were evaluated on a three-grade basis.

A ... Stain was absent or hardly detectable.
B ... A little but negligible stain
C ... Considerable stain (g) Tape Squeal The presence of any tape squeal was also checked during the tape running tests for 20 passes at 40° C., 80% RH, using 10 commercial cassette tape decks, and the results were evaluated on a four-grade basis.

A ... No tape squeal was heard.
B ... Non-continuous squeals were heard on 1–2 wheels.
C ... Continuous squeals were heard on 1–2 wheels.
D ... Continuous squeals were heard on not less than 3 wheels.

(h) White Powder Production

The tapes were placed at 60° C. for 6 hours and then at −10° C. for 6 hours. These processings were repeated for 48 hours. Thereafter, the surface of magnetic layer was investigated by a microscope.

EXAMPLE 2

| | |
|---|---|
| Co-coated Berthollide iron oxide (Co: 2.0 atomic %; FeO: 1.4; Hc: 660 Oe; acicular ratio: 10:1; average particle length: 0.5μ) | 100 parts |
| Vinyl chloride/vinyl acetate/vinyl alcohol copolymer (weight ratio: 95/5/5; polymerization degree: about 400) | 15 parts |
| Polyester polyurethane (molecular weight: about 130,000) | 10 parts |
| Branched saturated fatty acid shown in Table 2 | 2 parts |
| Butyl stearate | 1 part |
| Alumina (average diameter: 0.5μ) | 2 parts |
| Methyl ethyl ketone | 200 parts |
| Cyclohexanone | 100 parts |

The above composition was kneaded and dispersed for 3 hours by means of a batch type sand grinder, and then 6.7 parts (solid content: 5 parts) of polyisocyanate compound (trade name "Coronate L-75" manufactured by Nippon Polyurethane Co., Ltd.) was added to the composition, and it was further kneaded and dispersed for 30 minutes. The composition obtained was filtrated by a filter having an average pore size of 1 micron to obtain a magnetic coating composition.

The coating composition was coated on a polyethylene terephthalate film having a thickness of 14 microns in a dry thickness of 5 microns by means of a reverse roll. The coated film was subjected to magnetic orientation by a magnet of 2000 gauss before the magnetic recording layer was dried. Drying was then carried out. The magnetic recording layer was then subjected to a supercalender roll treatment to make the surface of the magnetic recording layer more smooth. The magnetic tape obtained was slit to a width of ½ inch and put in a VHS type cassette to obtain a videocassette tape. The characteristics of the tape are shown in Table 2.

Comparative Example 2

The same procedure as in Example 2 was repeated using a linear saturated fatty acid and a linear unsaturated fatty acid instead of the branched saturated fatty acid to obtain a video tape. The results were shown in Table 2.

EXAMPLE 3

The same procedure as in Example 2 was repeated using a Fe-Ni alloy powder (Fe:Ni=95:5; Hc: 1300 Oe; acicular ratio 10:1; average particle diameter: 0.3μ) instead of the Co-coated Berthollide iron oxide to obtain a video tape. The characteristics of the tape are shown in Table 2.

Comparative Example 3

The same procedure as in Comparative Example 2 was repeated by using a Fe-Ni alloy powder (Fe:Ni=95:5; Hc: 1300 Oe; acicular ratio: 10:1; average particle diameter: 0.3μ) instead of the Co-coated Berthollide iron oxide to obtain a video tape. The characteristics of the tape are shown in Table 2.

TABLE 2

| | Sample No. | Fatty Acid | Video Output (dB) | S/N Ratio (dB) | Still Life (min) | Video Running Properties | Staining | White Powder Production |
|---|---|---|---|---|---|---|---|---|
| Example 2 | 4 | Compound 1 | 0.6 | 0.7 | 90 | A | A | none |
| | 5 | Compound 2 | 0.4 | 0.5 | 90 | A | A | none |
| | 6 | Compound 3 | 0.3 | 0.6 | 100 | A | A | none |
| Comparative | C-3 | Oleic Acid | 0.0 | 0.0 | 60 | B | B | none |

TABLE 2-continued

|  | Sample No. | Fatty Acid | Video Output (dB) | S/N Ratio (dB) | Still Life (min) | Video Running Properties | Staining | White Powder Production |
|---|---|---|---|---|---|---|---|---|
| Example 2 | C-4 | Stearic Acid | −0.1 | 0.3 | 80 | B | B | present |
| Example 3 | 7 | Compound 1 | 12.6 | 9.4 | 60 | A | A | none |
|  | 8 | Compound 2 | 12.1 | 9.2 | 60 | A | A | none |
|  | 9 | Compound 3 | 12.3 | 9.1 | 70 | A | A | none |
| Comparative | C-5 | Oleic Acid | 10.8 | 7.6 | 20 | B | B | none |
| Example 3 | C-6 | Stearic Acid | 11.5 | 8.2 | 25 | B | B | present |

The various tape characteristics indicated in Table 2 were measured by the following methods:

(i) Video Output

The output at 4 MHz was measured using Model NV-6600 of Matsushita Electric Industrial Co., Ltd. (which was also used in (j) and (k) below). The output is shown by a relative value with the output of tape No. C-2 being set at 0.0 dB.

(j) S/N Ratio

The S/N ratio at 10 KHz to 4 MHz after visibility correction was measured. The ratio is a relative value under the assumption that the tape No. C-2 delivers an output of 0.0 dB.

(k) Still Life

The time for a serious defect to occur in a picture reproduced in a still mode was measured.

(l) Video Running Property

Video tape running tests were conducted with 20 commercial video tape decks for 50 runs to see if any jitter or skew occurred, and the results were evaluated on a two-grade basis.

A . . . No jitter or skew

B . . . A little but insignificant jittering or skewing (m) Staining

After evaluating of the tape running property, the tape running assembly of each deck was checked for the presence of stain and the results were evaluated on a two-grade basis.

A . . . Stain was absent or hardly detectable.

B . . . A little but negligible stain (n) White Powder Production

The same as in (h).

It is apparent from Table 1 that audio recording tapes of the invention which contain a branched saturated fatty acid and are shown by Sample Nos. 1 to 3 have a slightly higher frequency characteristic and higher MOL and SOL than audio recording tapes which contain a conventional fatty acid as shown by Sample Nos. C-1 and C-2. That is, the audio recording tapes of the present invention have better electromagnetic properties than conventional audio recording tapes. Further, Sample Nos. 1 to 3 showed less staining on tape heads than Sample Nos. C-1 to C-2, and do not cause tape squeal or white powder production. Thus they have better running properties and durability than Sample Nos. C-1 to C-2.

It is also apparent from Table 2 that video recording tapes of the present invention which contain a branched saturated fatty acid and are shown by Sample Nos. 4 to 9 have higher video output and S/N ratio than video recording tapes containing conventional fatty acid as shown by Sample Nos. C-3 to C-6. That is, video recording tapes of the invention have better electromagnetic properties. Further, Sample Nos. 4 to 9 have longer still life and better video running properties than Sample Nos. C-3 to C-6. In addition, Sample Nos. 4 to 9 produce less staining or white powder. Thus Sample Nos. 4 to 9 have better running properties and durability.

It will be understood from the above Examples that magnetic recording medium having better electromagnetic properties, running properties and durability can be obtained using branched saturated fatty acids than using conventional fatty acids.

While the invention has been described in detail and with reference to specific embodiments thereof, it will be apparent to one skilled in the art that various changes and modifications can be made therein without departing from the sperit and the scope thereof.

What is claimed is:

1. A magnetic recording medium, comprising;
a non-magnetic flexible support base, having coated thereon;
a magnetic layer comprised of a ferromagnetic powder dispersed in a binder and a branched saturated fatty acid having a melting point of 20° C. or less and having 12 or more carbon atoms.

2. A magnetic recording medium, as claimed in claim 1, wherein the branched saturated fatty acid has a melting point of 10° C. or less.

3. A magnetic recording medium, as claimed in claim 1 or 2, wherein the branched saturated fatty acid contains from 12 to 30 carbon atoms.

4. A magnetic recording medium, as claimed in claim 3, wherein the branched saturated fatty acid is present in an amount of about 0.1 to 10 wt% based on the amount of the ferromagnetic powder.

5. A magnetic recording medium, as claimed in claim 4, wherein the branched saturated fatty acid is present in an amount of 0.5 to 5 wt% based on the amount of the ferromagnetic powder.

6. A magnetic recording medium, as claimed in claim 5, wherein the ferromagnetic powder is comprised of $\gamma$-$Fe_2O_3$, Co-modified iron oxide and an alloy powder containing iron.

7. A magnetic recording medium, as claimed in claim 3, wherein the branched saturated fatty acid is selected from the group consisting of lauric acid having a melting point of 10° C. or less, myristic acid having a melting point of 0° C. or less and stearic acid having a melting point of 0° C. or less.

* * * * *